US007996197B1

(12) United States Patent
Xavier (10) Patent No.: US 7,996,197 B1
(45) Date of Patent: Aug. 9, 2011

(54) CLEARANCE DETECTOR AND METHOD FOR MOTION AND DISTANCE

(75) Inventor: Patrick G. Xavier, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1212 days.

(21) Appl. No.: 11/654,826

(22) Filed: Jan. 18, 2007

Related U.S. Application Data

(63) Continuation-in-part of application No. 10/661,237, filed on Sep. 12, 2003, now abandoned.

(60) Provisional application No. 60/410,580, filed on Sep. 12, 2002.

(51) Int. Cl.
*G06G 7/48* (2006.01)
*G06F 17/10* (2006.01)
*G05B 19/18* (2006.01)

(52) U.S. Cl. .......... 703/7; 703/2; 703/6; 703/8; 700/255

(58) Field of Classification Search .............. 703/2, 6–7; 700/255
See application file for complete search history.

(56) References Cited

U.S. PATENT DOCUMENTS

| 5,537,119 | A | 7/1996 | Poore |
| 5,675,720 | A | 10/1997 | Sato et al. |
| 5,808,623 | A * | 9/1998 | Hamburg ...................... 345/619 |
| 6,054,991 | A | 4/2000 | Crane et al. |
| 6,099,573 | A | 8/2000 | Xavier |
| 6,285,372 | B1 * | 9/2001 | Cowsar et al. ................ 345/420 |
| 6,285,805 | B1 | 9/2001 | Gueziec |
| 6,407,748 | B1 | 6/2002 | Xavier |
| 6,535,215 | B1 | 3/2003 | DeWitt et al. |
| 6,577,925 | B1 | 6/2003 | Fromherz |

OTHER PUBLICATIONS

Cameron, "Collision Detection by 4D Intersection Testing", Int'l J. of Robotics Research, vol. 6, No. 3, pp. 291-302 (Jun. 1990).
Canny, "Collision Detection for Moving Polyhedra," IEEE Trans. on Pattern Analysis and Machine Intelligence, vol. 8, No. 2, pp. 200-209 (1986).
Fuchs, et al., "On Visible Surface Generation by a Priori Tree Structures", Proc. of ACM SIGGRAPH, pp. 124-144 (1980).
Gilbert, et al., "Computing the Distance Between General Convex Objects in Three-Dimensional Space," IEEE Trans. on Robotics and Automation, vol. 6, No. 1, pp. 53-61 (Feb. 1990).

(Continued)

*Primary Examiner* — Paul L Rodriguez
*Assistant Examiner* — Aniss Chad
(74) *Attorney, Agent, or Firm* — Olivia J. Tsai (57) ABSTRACT

A method for correct and efficient detection of clearances between three-dimensional bodies in computer-based simulations, where one or both of the volumes is subject to translation and/or rotations. The method conservatively determines of the size of such clearances and whether there is a collision between the bodies. Given two bodies, each of which is undergoing separate motions, the method utilizes bounding-volume hierarchy representations for the two bodies and, mappings and inverse mappings for the motions of the two bodies. The method uses the representations, mappings and direction vectors to determine the directionally furthest locations of points on the convex hulls of the volumes virtually swept by the bodies and hence the clearance between the bodies, without having to calculate the convex hulls of the bodies. The method includes clearance detection for bodies comprising convex geometrical primitives and more specific techniques for bodies comprising convex polyhedra.

14 Claims, 1 Drawing Sheet

OTHER PUBLICATIONS

Gottshalk, et al., "Obb-Tree: A hierarchical Strucutre for Rapid Interference Detection", Proc. ACM SIGGRAPH '96, pp. 171-180 (Aug. 1996). Sato, et al., "Efficient Collision Detection Using Fast Distance Calculation Algorithms for Convex and Non-Convex Objects", Proc. 1996 IEEE Int'l Conf on Robotics and Automation, Minneapolis, MN pp. 771-778 (Apr. 1996).

Xavier, Implicit Convex-Hull Distance of Finite-Screw-Swept Volumes, 2002 IEEE Int'l Conf on robotics and Automation (CRA) (May 2002).

Xavier, "Fast Swept-volume Distance for Robust Collision Detection", 1977 IEEE Int'l conf on Robotics and Automation, (1977).

Office Action mailed Jul. 28, 2006, in U.S. Appl. No. 10/661,237, Confirmation No. 6847.

* cited by examiner

Figure 1

CLEARANCE DETECTOR AND METHOD FOR MOTION AND DISTANCE

CROSS-REFERENCE TO RELATED APPLICATIONS

This application claims the benefit of the filing of U.S. Provisional Patent Application Ser. No. 60/410,580, entitled "A Collision Detector and Method for Motion and Distance", filed on Sep. 12, 2002. This application is a continuation-in-part of U.S. patent application Ser. No. 10/661,237 filed on Sep. 12, 2003 now abandoned entitled "Clearance Detector and Method for Motion and Distance". The entireties of both applications thereof are incorporated herein by reference.

STATEMENT REGARDING FEDERALLY SPONSORED RESEARCH OR DEVELOPMENT

This invention was made with Government support under Contract DE-AC04-94AL85000 awarded by the U.S. Department of Energy. The Government has certain rights in the invention.

FIELD OF THE INVENTION

The present invention relates to methods for modeling interactions among entities having geometry, specifically for interference and collision detection and distance computation.

BACKGROUND OF THE INVENTION

This invention relates to the field of modeling interactions among entities having geometry, specifically for interference and collision detection and distance computation. Note that the following discussion refers to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes.

A recurrent problem in computer-based simulations of geometric volumes is determining the clearances between volumes. Many applications, including robotics and visualization, require modeling of interactions of objects to facilitate users in motion planning, control of automation, graphical programming, motion-preview, virtual reality and dynamic simulation. In robotics, for example, this modeling permits detection of possible collisions between a robot and obstacles within its environment, or another robot. Both accuracy and efficiency are needed. Accuracy is needed because inaccurate determination of clearances could lead to physical collisions. Efficiency is needed because, in the real-time computational context of robotics, information about clearances is required while the robot and elements of the environment are in motion. The determination should also be conservative, so as not to miss the closest approach of two volumes.

Early methods for clearance determination did not provide distance information for clearances among volumes. See, e.g., Fuchs et al., "On Visible Surface Generation by a priori Tree Structures," Proc. of ACM SIGGRAPH, pages 124-133, 1980. Later methods addressed this problem but did not handle swept-body distance or swept-body interference detection. See, e.g., Sato et al., "Efficient Collision Detection Using Fast Distance Calculation Algorithms for Convex and Non-convex Objects," Proc. 1996 IEEE Int'l Conf on Robotics and Automation, pages 771-778, Minneapolis, Min., April 1996; Gottschalk et al., "OBB-tree: A Hierarchical Structure for Rapid Interference Detection," Proc ACM SIGGRAPH'96, pages 171-180, August 1996. Further methods were able to handle swept volumes but did not provide clearance distance information for volumes that did not collide. See Canny, John, "Collision Detection for Moving Polyhedra," IEEE Trans. on Pattern Analysis and Machine Intelligence, 8(2):200-209, 1986; and Cameron, "Collision Detection by 4D Intersection Testing", Intl Journal of Robotics Research, 6(3):291-302, June 1990.

These drawbacks were substantially addressed by the Applicant in U.S. Pat. No. 6,099,573, "Method and Apparatus for Modeling Interactions"; and U.S. Pat. No. 6,407,748, "Method and Apparatus for Modeling Interactions". These advances are discussed in Xavier, Patrick, G., "Implicit Convex-Hull Distance of Finite-Screw-Swept Volumes", 2002 IEEE International Conference on Robotics and Automation (ICRA) (May 2002). U.S. Pat. No. 6,099,573 describes a method for determining collisions and clearances, including distances, through calculations of bounding volumes based on unions of convex polygons and polyhedra. The above method, which computes an approximate minimum clearance between the volumes swept by two bodies under motion, was faster and more robust than the prior art.

U.S. Pat. No. 6,407,748 involved a complementary computation of clearances where two bodies were undergoing translation. This method computes the exact minimum clearance (to numerical precision limited by the representation of floating point numbers on the computer component of the invention) between the volumes swept by two bodies only undergoing translation.

Performance of applications such as robots and visualization is still limited by the computational efficiency of the clearance calculations. U.S. Pat. No. 6,099,573 and U.S. Pat. No. 6,407,748 both required explicit calculation of all the vertices of polyhedral approximations of the convex hulls of volumes swept by various nodes in the representations of the modeled objects. The present invention does not require explicit calculation of the vertices of polyhedral approximations of the convex hulls. Rather, the methods of the present invention provide more efficient computation of the clearance calculation by adapting an algorithm of Gilbert and Foo (Gilbert and Foo, "Computing the Distance Between General Convex Objects in Three—Dimensional Space", IEEE Transactions on Robotics and Automation, Vol. 6, No. 1, February 1990, pages 53-61). The prior art was also limited by the kinds of the volumes that could be modeled. The present invention further permits use of a greater number of types of geometric primitives in modeling the volumes, including polyhedra, cones, cylinders and discs.

By avoiding computation of any explicit representations (exact or approximate) of the volumes swept by nodes of the modeled bodies, the present invention comprises a method that is faster than prior art, for the same accuracy. The hierarchical distance implementation of the present invention does not construct a swept bounding volume hierarchy (BVH) representation of either of the first or the second bodies.

The geometric representations of the bodies comprise unions of Convex Geometric Primitives (CGPs), including but not limited to convex polygons, convex polyhedra, closed discs, cones, cylinders, and spheres. From these CGPs, the BVH representations can be generated in pre-processing for each body. This can be done using various methods known to those skilled in the art. See for example, P. G. Xavier, "A Generic Algorithm for Construction Hierarchical Representations of Geometric Objects", in Proceedings of the 1996 IEEE Intl Conf. on Robotics and Automation, pp. 3644-3651, Minneapolis, Minn., April 1996. A BVH is a tree whose nodes and leaves comprise CGPs.

An advance of the present invention is that it does not explicitly compute swept volumes. Instead, for a series of pairs of nodes, one node each from the respective BVHs, it determines the clearance between the convex hulls of the volumes "virtually swept" by the two nodes under the motions of their respective bodies. This makes the present invention more accurate than U.S. Pat. No. 6,099,573. Towards determining this clearance, the method determines for each of a series of direction vectors the furthest point "virtually swept" by a node, comprising one or more CGPs, over a period of time. To determine this clearance, embodiments of the present invention extend the algorithm of Gilbert and Foo for finding the minimum distance between two (stationary) convex geometric objects, by determining for each of a series of direction vectors, the location of the furthest point "virtually" swept by a node over a period of time, i.e. a node undergoing a motion.

Methods according to the present invention can utilize a representation (also referred to as a canonical representation) of a body in its canonical ("home") position and orientation. The convex hull of a node from this representation that has been mapped to an arbitrary position and orientation can be compared to a direction vector ("w" vector) to locate the point on the convex hull that is furthest away, in the direction of the direction vector. This location which can be a vertex or point on the convex hull is referred to as the directionally furthest location (or vertex or point). Those skilled in the art will recognize that it is not necessary to construct a new BVH for the starting position of a body prior to each motion it may undergo.

The methods of the present invention can be applied to bodies undergoing motions including but not limited to translation, rotation, and translation concurrent with rotation, wherein motions can be described by time-dependent mappings. By determining an inverse mapping of the motion and applying the inverse mapping to the direction vector (w vector), then mapping the result to the original canonical representation of the body without actually sweeping out the volume according to the motion, the invention can determine the furthest point in the direction of the direction vector on the convex hull of the virtually swept volume generated by any given node of the BVH. The methods account for the swept volume due to the node and its body's motion over a period of time to determine the furthest point in a particular direction during the entire time period and locates this furthest point without performing the brute-force and computationally intensive calculation of an explicit representation of an approximate superset of the volume swept by the node over the period of time. Coordinated computations enable determination of the separation between the volumes virtually swept by pairs of nodes from the respective BVH representations. This provides a quick and reliably conservative determination of separation and/or collision detection of moving bodies over time to permit inter alia, collision avoidance.

Where a node comprises a convex polyhedron, the present invention determines the transition of the directionally furthest vertex to an edge-adjacent vertex on that polyhedron due to the motion of the direction vector under an inverse mapping (i.e. inverse time-dependent mapping). The determining of transitions from a vertex to an edge-adjacent vertex due to the motion of the direction vector under this mapping, is a unique aspect of the present invention.

Others have described trajectory calculations but do not provide the advance of the present invention. U.S. Pat. No. 5,537,119, "Method and System for Tracking Multiple Regional Objects by Multi-dimensional Relation", provides a novel algorithm for detecting trajectory collisions, but the method involves tracks of objects that are not modeled with respect to volume. U.S. Pat. No. 6,285,805, "System and Method for Finding the Distance From a Moving Query Point to the Closest Point on One or More Convex or Non-convex Shapes", involves a kind of calculation unrelated to the present invention. The method of U.S. Pat. No. 6,285,805 is appropriate for polygonal mesh-type models rather than the volume-based models of the present invention. U.S. Pat. No. 5,675,720, "Method of Searching for Points of Closest Approach, and Preprocessing Method Therefore" (Sato, et al.), also uses a mesh-type model and uses the original Gilbert algorithm directly. Moreover, although Sato's claims use the term "points of closest approach" in its Background and Description, it is clear that this term refers to the points of minimum distance between two objects at discrete (separated) points in time, rather than for the modeled objects across the entire time interval of their motion.

Another approach is to specialize the modeling of the volumes to a particular application domain, so that the collision-detection problem can be solved for a specific application rather than generally. An example of this approach is U.S. Pat. No. 6,577,925, "Apparatus and Method of Distributed Object Handling". In this case, the volumes consist of "envelopes" that have been predetermined, based on known object geometry and trajectories, before the real-time computation to ensure non-collisions during subsequent movements along the predetermined trajectories. The clearance-detection computation can then use a brute-force algorithm rather than the more efficient algorithm of the present invention.

Other related work includes inventions for computer animation and virtual reality. Examples include U.S. Pat. No. 6,535,215, "Method for Animating 3-D Computer-Generated Characters", and U.S. Pat. No. 6,054,991, "Method of Modeling Player Position and Movement in a Virtual Reality System". While animation and VR need collision detection for modeled objects, in both of these cases the underlying representations differ from that of the present invention and hence lead to substantially different algorithms. The animation system, because it is not real-time, uses a brute-force algorithm for collision detection. The VR system, although real-time, does not have true 3-D representation of objects. Rather, it represents the objects in a series of planes, detecting 2-D collisions within the planes, again using a simpler brute-force approach.

BRIEF DESCRIPTION OF THE SEVERAL VIEWS OF THE DRAWINGS

The accompanying drawings, which are incorporated in and form part of the specification, illustrate several embodiments of the present invention and, together with the description, serve to explain the principles of the invention. The drawings provided herein are not drawn to scale.

DETAILED DESCRIPTION OF THE INVENTION

The present invention relates to a method for modeling interactions among entities having geometry, specifically for interference and collision detection and distance computation. Using an adaptation of the Gilbert and Foo algorithm (see for example, E. G. Gilbert and C. K. Foo, "Computing the Distance Between General Convex Objects in Three—Dimensional Space", IEEE Transactions on Robotics and Automation, Vol. 6, No. 1, February 1990, pages 53-61, the reference hereinafter referred to as "Gilbert/Foo" and the algorithm simply as the "Gilbert/Foo algorithm") the method conservatively determines distances between bodies under motion without having to explicitly calculate the vertices of the swept volumes. The term "virtually swept" as used herein refers to methods for determining distances between bodies without necessarily computing the vertices of representations of the volumes swept by the bodies. "Conservatively" means that the approximate distance determined by the method will never be smaller than the actual minimum distances between the bodies under motion. The method further uses an adaptation of hierarchical search of the bounding volume hierarchical representations of the bodies, for overall efficiency while maintaining correctness.

Given two bodies, each of which comprises a union of convex geometric primitives and each of which is undergoing separate motions, the method operates upon bounding volume hierarchy ("BVH") representations of the two bodies and, mappings and inverse mappings for the motions of the two bodies. The motions of the bodies can begin at positions and orientations other than the bodies' canonical (i.e. "home") positions and orientations. Those skilled in the art will recognize that it is not necessary to construct a new BVH for the starting position of a body prior to each motion it may undergo. The method uses the BVH representations, mappings, inverse mappings, a hierarchical search, and re-computations of a direction vector to determine a first convex geometric primitive component from the first body (i.e. a first node) and second convex geometric primitive component from the second body (i.e. a second node) such that the clearance between the convex hull of the volume virtually swept by the first convex primitive under the motion of the first body (i.e. first node-swept volume) and the convex hull of the volume virtually swept by the second convex primitive under the motion of the second body (i.e. second node-swept volume) conservatively approximates the minimum clearance between the two bodies under their respective motions. A first convex primitive component and a second convex primitive component having this property are known as witness primitives. The method either determines that the clearance between the convex hulls of the virtually swept first and second witness primitives is zero or, if the clearance is greater than zero, finds a point on each of these two convex hulls such that the distance between those points is the clearance between these convex hulls. A pair of such points is referred to as witness points. Methods according to the present invention do not require that the witness points be located at the vertices of the convex hulls.

Based on the determination of the distance between the witness points, the size of a positive clearance between the bodies can be calculated. Based on determination that the clearance between the convex hulls of virtually swept volumes of the witness primitives is zero, a zero clearance between the bodies can be determined.

Based on the size of the clearance between the bodies, it can be determined whether the bodies collide. A zero clearance signifies a collision, and a positive clearance robustly signifies no collision.

The clearance-detection method can be applied to bodies where the first body has a screw motion consisting of a translation concurrent with a rotation and the second body has a second screw motion consisting of a second translation concurrent with a second rotation, to bodies where the first body has a translation and the second body has a second translation, to bodies where the first body has a rotation and the second body has a second rotation, and to bodies where one body has a rotation and the other body has a translation.

The clearance-detection method can be applied to time-dependent simulations where the two bodies undergo a series of motions, as for example, where it may be desired to decompose a long motion into a series of shorter motions.

The determination of a pair of witness primitives for a pair of bodies undergoing motion can be implemented using a bounding volume hierarchy (BVH) representation for each body comprising a union of convex geometric primitives and, applying an extension of a hierarchical minimum-distance search algorithm to the two BVH representations. The convex primitive components (i.e. convex geometric primitives) whose union comprises a body are the leaf nodes of a BVH representation of that body. Note that the terms "hierarchical bounding volume representation" and "bounding volume hierarchy representation" mean the same thing. As further described below, at each step of the recursive hierarchical minimum-distance search, instead of simply computing the distance between a node from the BVH representation of the first body and a node from the BVH representation of the second body, the method computes the distance between the convex hulls of the volumes virtually swept by a node from the BVH representation of the first body under its motion (i.e. a first node-swept volume) and a node from the BVH representation of the second body under its motion (i.e. a second node-swept volume). Based on a comparison of this distance with the minimum distance found so far (i.e. in previous steps of the hierarchal minimum-distance search) between convex hulls of virtually swept volumes of convex geometric primitives that comprise the first body and convex hulls of virtually swept volumes of convex geometric primitives that comprise the second body, the search algorithm decides whether subsequent steps in the search will need to consider the virtually swept volume of additional nodes with respect to the virtually swept volumes of each of the children of the other. The pair of convex primitive components with the distance between the convex hulls of their virtually swept volumes that is the minimum of those found when the minimum distance search terminates is the pair of witness primitives.

The clearance between the bodies can be determined by computing the distance between the convex hulls of the volumes virtually swept by the witness primitives found by this extension to the hierarchical minimum-distance search.

For purposes of calculating the distance between the convex hulls of the volumes virtually swept by a pair of nodes from the respective BVH representations of the two bodies, an adaptation of the Gilbert/Foo algorithm for computing the distance between two convex geometric objects is used. A novel computation that the present invention provides is that of determining a directionally furthest location on the convex hull of the volume virtually swept by a node. A node can comprise one or more convex geometric primitives (i.e. CGPs). By adapting the Gilbert/Foo algorithm to use this computation, methods of the present invention obviate the need for explicitly computing (and re-computing) the vertices of the convex hulls of the volumes swept by the nodes. The determination of the directionally furthest location of the convex hull of the volume virtually swept by the node from the BVH representation of the first body can be implemented by applying an inverse mapping of the first motion to the direction vector; and then applying a time-dependent mapping of the first motion to the node to find the directionally furthest location on that node with respect to the (moving) inversely-mapped direction vector. The determination of the directionally furthest location of the convex hull of the volume virtually swept by the node from the BVH representation of the second body can be implemented using the BVH representation, motion, mapping, inverse mapping, and direction vector, appropriate to the second body. The direction vector referred herein as the "w vector" or simply as "w" is adapted from Gilbert/Foo and further described below.

The convex geometric primitives composing the two bodies are selected from the group consisting of polygons, polyhedra, cylinders, cones, and other closed geometry.

The clearance-detection method for bodies comprising convex geometric primitives can be applied to time-dependent simulations where the two bodies undergo a series of motions, for example, where a long motion is decomposed into a series of shorter motions.

The method for clearance detection can be applied to the case where one body undergoes a motion and the other body is at rest. In this case, the method utilizes BVH representations for the two bodies and creates a mapping and inverse mapping for the motion of the moving body. The motion of the moving body can begin at a position and orientation other than the body's canonical position and orientation. The method uses the representations, mappings, hierarchical search, and re-computations of a direction vector to determine a convex geometric primitive component from the moving body and a convex geometric primitive component from the stationary body such that the clearance between the convex hull of the volume virtually swept by the convex primitive from the moving body under the motion of that body and the convex primitive from the stationary body conservatively approximates the clearance (i.e. returns a minimum clearance) between the two bodies under their respective motions. Such a pair of convex primitive components from the respective bodies and having this property is known as a pair of witness primitives. The method either determines that the clearance between the stationary witness primitive and the convex hull of the virtually swept volume of the moving witness primitive is zero, or, if the clearance is greater than zero, finds a point on the stationary witness primitive and a point on the convex hull of the virtually swept volume of the moving witness primitive such that the distance between those points is the clearance between the convex hull of volume virtually swept by the moving witness primitive and the stationary convex primitive. A pair of such points is referred to as a pair of witness points.

Where one body is moving and the other body is at rest, for purposes of calculating the distance between a node from the BVH representation of the stationary body and the convex hull of the volume virtually swept by a node from the BVH representations of the moving body, an extension to the Gilbert/Foo algorithm for computing the distance between two convex geometric objects is used. For a given direction vector, the determination of the directionally furthest location of the convex hull of the volume virtually swept by the node from the BVH representation of the moving body can be implemented by applying the relevant inverse mapping to the direction vector; and then using the inverse mapping to find the directionally furthest location on that node with respect to the (moving) inversely-mapped vector.

Where one body is moving and the other body is at rest, the clearance-detection method can be applied to bodies where the moving body has a screw motion consisting of a translation concurrent with a rotation, to bodies where the moving body has a translation, and to bodies where the moving body has a rotation.

Where a node in the BVH representation of a body is a convex polyhedron and that body is moving, the determination of the directionally furthest location on the convex hull of the volume virtually swept by that node under the motion of the body can be implemented by applying the relevant inverse mapping to the direction vector; and then using the inverse mapping to find the directionally furthest location on that node with respect to the (moving) inversely-mapped vector. The method uses the polyhedron representation, motion, mapping, inverse mapping, and direction vector to determine the initially directionally furthest vertex of the polyhedron, transitions of the directionally furthest vertex to an edge-adjacent vertex on that polyhedron due to motion of the inversely mapped direction vector, and subsequent changes of the directionally furthest vertex to an edge-adjacent vertex due to motion of the inversely mapped direction vector.

A more detailed description of the invention in its preferred form is next provided, employing the following definitions of interference detection, distance computation, and collision detection for a single moving body. Interference detection (or clash detection) for a rigid body R at a position and orientation x and obstacles O means to determine whether $R(x) \cap O$ is non-empty, with $R(x)$ denoting the image of R in the world. Distance computation means to determine the minimum distance between all points in $R(x)$ and those in O. Simple collision detection for a rigid body R moving over a path segment among obstacles O means to determine whether at any point along the path the body contacts or intersects any obstacles. In other words, if one lets C denote the space of positions and orientations and let $p:[0,1] \rightarrow C$ denote the path segment, then collision detection asks whether there is any $t \in [0,1]$ such that $R(p(t)) \cap O$ is non-empty.

This application first reviews the Gilbert/Foo algorithm at a high level, where the original, enhanced, and generalized versions are identical. It then conceptually describes how to extend the Gilbert/Foo algorithm to compute the distance between the convex hulls of the volumes virtually swept by a pair convex geometric primitives undergoing finite screw motion. It then reviews the use of bounding volume hierarchies and convex geometric primitives for distance computation between rigid bodies and describes the extension that yields the general result.

Given a compact set $X \subset \mathbb{R}^k$ Gilbert/Foo defines support functions $h_x$ and $s_x$, such that for each nonzero vector $w \in \mathbb{R}^k$:

$$h_X(w) = \max_{x \in X} w \cdot x; \text{ and,} \qquad \text{(Eqn. 1)}$$

$$s_X(w) = \text{some } x \in X \text{ s.t. } w \cdot x = h_X(w) \qquad \text{(Eqn. 2)}$$

If the support functions for $X_1, X_2 \subset \mathbb{R}^k$ can be computed, then one can apply the Gilbert/Foo algorithm to find the minimum distance vector between their convex hulls $\text{conv}(X_1)$ and $\text{conv}(X_2)$. In the simple case, $X_1$ and $X_2$ are convex and identical to their convex hulls.

Pseudocode for the Gilbert/Foo algorithm is presented below in Table 1. A key observation is that the only operations that are directly dependent on the inputs A and B are the support functions $s_A$ and $s_B$ and finding initial points in A and B. "closestToOrigin(S)" finds the point in S closest to the origin. "minimalSimplex(S,w)" finds the minimal simplex generated by the vertices of S that contains w. "terminationCondition(w,x,dist)" is a predicate that decides whether w and dist are as close to the actual minimum distance vector and distance as can be computed by the algorithm; it returns true when dist is zero, which is the case when S has full dimension. It should be noted that in the algorithm that the direction vector corresponding to the second body, i.e. "−w"

is related (as being in the opposite direction) of the direction vector corresponding to the first body, i.e. "w".

TABLE 1

Pseudocode for the Gilbert/Foo Algorithm

```
real Gilbert/Foo(convex A, convex B)
{
    x_A ∈ A; x_B ∈ B
    w = x = x_B - x_A;
    simplex S = {x};
    do {
        x_A = s_A(w); x_B = s_B(-w);
        x = x_B - x_A;
        S = simplex(S ∪ {x} );
        w = closestToOrigin(S);
        S = mimimalSimplex(S,w);,
        dist = √w·w
    } while (!terminationCondition(w, x, dist);
    return (w, dist);
}
```

The enhanced Gilbert/Foo Algorithm for convex polyhedra improves on the original by using hill-climbing in computing the support functions, $s_A$ and $s_B$. This lowers the complexity of the loop interior to roughly $O(\sqrt{n})$ from $O(n)$. Applicant was previously unable to apply hill-climbing to Applicant's earlier conservative distance algorithm (e.g. as described in U.S. Pat. No. 6,099,573) because for a given polyhedron's vertex set hill-climbing generated points that could lie interior to the convex hull of the polyhedron's swept volume. In contrast, the methods of the present invention are roughly $O(\sqrt{n})$ and apply hill-climbing.

To generalize Gilbert/Foo algorithm to the convex hulls of the volumes swept by a pair of convex geometric primitives (CGPs), one needs to compute the support functions of the convex hulls of the swept volumes. For example, one observes that the convex hull of the vertices of a polyhedron and their (swept) images under any given motion is equal to the convex hull of the volume swept by that polyhedron under that motion. Therefore, if it is possible to compute $h_X(.)$ and $s_X(.)$ whenever X is the image of the vertices of a polyhedron under a given class of motions, the distance between the convex hulls of the volumes swept out by any two polyhedra undergoing motions from this class can be computed by applying the generalized Gilbert/Foo algorithm. The complexity of the loop interior remains roughly $O(\sqrt{n})$ when the rotation angle is bounded by a constant, e.g., 6.2832.

Next presented is a general approach to computing support functions for CGPs undergoing finite screw motions. Further below is shown in detail how $h_X(.)$ and $s_X(.)$ can be computed when X is the image of a point under finite screw motion $X=(\hat{n},\theta,x_a,x_{tr})$, which is given by:

$$X(t,p)=R(\hat{n},t\theta)(p-x_a)+x_a+tx_{tr} \quad \text{(Eqn. 3)}$$

where p is the point being moved, path parameter $t\in[0,1]$, $x_{tr}$ is the translational component, $R(\hat{n},\theta)$ is the rotation matrix for non-negative angle $\theta$ about $\hat{n}$, and the original axis of rotation goes through $x_a$. Below, the invention extends this to compute $h_X(.)$ and $s_X(.)$ when X is the image of a convex polyhedron (or polygon) undergoing finite screw motion. The general approach below can be applied to other CGPs such as discs, cones, cylinders, etc.

This application has so far used static compact sets $X \subset \mathbb{R}^k$ to index the support functions, but one now wishes to consider sets in $\mathbb{R}^k$ that move according to screw motion. Overloading the notation, functions $h_X(..)$ and $s_X(..)$ are defined such that for all $w \in \mathbb{R}^k$ and compact subsets X of $\mathbb{R}^k$;

$$s(w,X)=s_X(w) \text{ and,} \quad \text{(Eqn. 4)}$$

$$h(w,X)=h_X(w). \quad \text{(Eqn. 5)}$$

Let $X=(\hat{n}, \theta, x_a, x_{tr})$ be a screw motion as above in (Eqn. 3). Further overloading the notation, define $$X(t,X)=\{x:x=X(t,y) \text{ for some } y\in X\} \text{ and,} \quad \text{(Eqn. 6)}$$

$$X(X)=\{x\in X(t,X) \text{ for some } t\in[0,1]\}. \quad \text{(Eqn. 7)}$$

For any such given X and X, clearly:

$$h(w,conv(X(X)))=h(w,X(X)). \quad \text{(Eqn. 8)}$$

It follows that if X and Y are compact and X and Y are finite screw motions, and one can compute $s(w,X(X))$, $h(w,X(X))$, $s(w,Y(Y))$, and $h(w,Y(Y))$, for all $w \in \mathbb{R}^k$, then one can, apply the generalized Gilbert/Foo algorithm to compute the minimum distance and a minimum distance vector between conv(X(X)) and conv(Y(Y)). Pseudocode for the generalized Gilbert/Foo algorithm is presented below in Table 2.

TABLE 2

Pseudocode for the Generalized Gilbert/Foo Algorithm

```
real Generalized Gilbert/Foo(convex A, motion X, convex B, motion Y)
{
    x_A ∈ A; x_B ∈ B
    w = x = X(0,x_B) - Y(0,x_A);
    simplex S = {x};
    do {
        x_A = s(w, X(A)); x_B = s(-w, Y(B));
        x = x_B - x_A;
        S = simplex(S ∪ {x} );
        w = closestToOrigin(S);
        S = mimimalSimplex(S,w);
        dist = √w·w
    } while (!terminationCondition(w, x, dist);
    return (w, dist);
}
```

Given $X=(\hat{n},\theta,x_a,x_{tr})$, one has $$h(w,X(t,X))=h(R^T(\hat{n},t\theta)w,X)-(R(\hat{n},t\theta)x_a)\cdot w+x_a\cdot w+tx_{tr}\cdot w \quad \text{(Eqn. 9)}$$

and, $$s(w,X(t,X))=R(\hat{n},t\theta)\{s(R^T(\hat{n},t\theta)w,X)\}-R(\hat{n},t\theta)x_a+x_a+tx_{tr} \quad \text{(Eqn. 10)}$$

More generally, suppose that P is the convex hull of X Then the convex hull of the volume swept by P under a time-dependent, convexity-preserving map X is the convex hull of the volume swept by X under that map. Suppose that Q is the convex hull of set Y and Y is a time dependent, convexity-preserving map. If one can compute the support functions $h(..)$, and $s(..)$ for X(X) and Y(Y), then one can compute the distance and distance vector between the convex hulls of the volumes swept by P and Q under motions X and Y. For example, if one can compute the support functions of discs and points under finite screw motion, the class of geometric objects for which one can do this includes cones and cylinders.

Since $$h(w, X, (\chi)) = \max_{t\in[0,1]} h(w, X(t, \chi)) \quad \text{(Eqn. 11)}$$

computing h(w,X(X)) and s(w,X(X)) reduces to finding some t*∈[0,1] that maximizes h(w,X(t,X)). To find maxima in (0,1), one computes time derivatives of h(w,X(t,X)) in (Eqn. 9) and solves for t that zeroes the first derivative. If X is a point, disc, or ellipse, then this condition can be reduced to solving an equation that is algebraic in cos(tθ), so that substituting in y=cos(tθ) yields an equation that is algebraic in y. The usual methods can then be used to find $$\max_{t \in [0,1]} h(w, X(t, \chi)).$$

Plugging the maximizing t* into (Eqn. 9) and (Eqn. 10), one obtains the values of the support functions. It follows that one can compute the support functions of the volumes swept by the convex hulls of finite sets of points, discs, and ellipses under screw motion.

Note that the methods for computing the support functions of the volumes swept by CGPs under finite screw motion can be used to compute tight bounding boxes or k-DOPs around those swept volumes; the former is preferred.

Assume that bodies are represented by unions of Convex Geometric Primitives (CGPs) with unrestricted orientation, for example: convex polygons, convex polyhedra, closed discs, cones, cylinders or spheres. From these CGPs, in pre-processing one generates a bounding volume hierarchy (BVH) representation of the body, which can be done using various known methods. A BVH is a tree whose nodes are each CGPs, and whose leaves are the original CGPs from the model. The subtree rooted at a node represents the union of the primitives at its leaves, and each non-leaf node is a spatial superset of the object represented by its subtree. Given a BVH representation of a body, it is simple to obtain a BVH that results from applying a rigid-body transformation to it (i.e. to translate a body into a new position prior to the start of a motion). The tree structures are identical. One applies the transformation to map each node in the original BVH to a corresponding node in the mapped (i.e. node at the initial position prior to motion) BVH. In the preferred embodiment, one does not actually construct the mapped BVHs (i.e. does not explicitly compute the vertices of a BVH) but computes distance computations between mapped nodes as they are needed by incorporating the transformations into BVH-BVH distance code. Pseudocode for the BVH-BVH distance code is given below in Table 3.

TABLE 3

Pseudocode for the BVH-BVH Distance Computation

```
real BVH_Dist(body *BODY1 , body *BODY2)
{
    real dist ← ∞ ;
    pairQueue queue;
    body *b1,*b2;
    queue.enqueue(BODY1,BODY2,0);
    while (!queue.isEmpty( )) {
        queue.pop front(&b1,&b2);
        if (isLeaf(b1) ˆ isLeaf(b2))
            dist← min(dist,convDist(b1,b2));
        else {
            HD← convDist(b1,b2);
            if (HD > dist)
                continue;
            else if (splitRight(b1,b2)) {
                queue.enqueue(b1, b2→child 1, HD);
                queue.enqueue(b1, b2→child2, HD);
            }
```

TABLE 3-continued

Pseudocode for the BVH-BVH Distance Computation

```
            else{
                queue.enqueue(b1→child1,b2,HD);
                queue.enqueue(b1→child2,b2, HD);
        }}}
        return dist;
}
```

To perform distance computation between two BVHs, the invention uses a branch-and-bound search algorithm such as that shown just above (see Table 3), which applies to BVHs that are binary trees. At each stage one considers a pair of nodes, one from each tree, as retrieved from a queue of pairs. One begins by enqueuing the roots and setting the distance dist to infinity. If both nodes are leaves, one sets dist to their distance if it is smaller than the current value. Otherwise, if the distance between the bounding volumes of the current nodes is no greater than dist, then one enqueues two or possibly more (if the BVHs are not binary) pairs of nodes: the current node from one tree paired with each of the children of the current node from the other. The queue ordering policy determines the search order but does not affect the correctness. (For example, a LIFO ordering policy is equivalent to a stack.) splitRight(b1,b2) decides which node should be split. convDist(b1,b2) computes the distance between two CGPs as mapped by the respective rigid-body transformations.

Those skilled in the art will appreciate that by initializing dist to a desired clearance threshold instead of to infinity, one can easily modify the algorithm to more efficiently determine whether there is a clearance of at least dist between the volumes swept by the bodies.

For CGPs for which one can compute the support functions over the duration of a screw motion, one applies the generalized Gilbert/Foo algorithm to conservatively approximate the distance between the volumes swept by those CGPs undergoing screw motion. Observe that if A, B, and C are convex and A∪B ⊂ C , then:

sweep (A,x)∪sweep (B,x) ⊂ sweep (C,x). Therefore, the conservative, bounding volume approximation nature of the invention's hierarchies is preserved by taking the convex hulls of swept volumes.

This means that one can do the following to the algorithm of BVH_Dist. First, add motions X and Y (e.g., X=($\hat{n}$, θ, $x_a$, $x_{tr}$)), which are to be applied to BODY1 and BODY2, to the parameter list. One can then generalize the convDist(b1,b2) to a more general function call convDist(b1, X, b2, Y), which computes the distance between the convex hull of the volume swept by b1 under motion X and the convex hull of the volume swept by b2 under motion Y. The resulting method computes a conservative approximation of the distance between the volumes swept by BODY1 and BODY2 under screw motions X and Y. Pseudocode for the resulting generalized BVH-BVH distance calculation is presented below, in Table 4.

TABLE 4

Pseudocode for the Generalized BVH-BVH Distance Computation.

```
real BVH_Dist(body *BODY1, motion X , body *BODY2, motion Y )
{
    real dist ← ∞ ;
    pairQueue queue;
    body *b1,*b2;
    queue.enqueue(BODY1,BODY2,0);
```

TABLE 4-continued

Pseudocode for the Generalized BVH-BVH Distance Computation.

```
        while (!queue.isEmpty( )) {
            queue.pop front(&b1,&b2);
            if (isLeaf(b1) ˆ isLeaf(b2))
                dist← min(dist,convDist(b1, X, b2, Y ));
            else {
                HD← convDist(b1, X, b2, Y );
                if (HD > dist)
                    continue;
                else if (splitRight(b1,b2)) {
                    queue.enqueue(b1, b2→child1, HD);
                    queue.enqueue(b1, b2→child2, HD);
                }
                else{
                    queue.enqueue(b1→child1,b2,HD);
                    queue.enqueue(b1→child2,b2, HD);
        }}}
        return dist;
}
```

The following describes how to compute the support functions s and h for screw motions. For this description, the orientation and position of a CGP at the start of the motion is assumed to be its home or canonical orientation and position. As described above, those skilled in the art will appreciate it is a trivial task to apply a rigid body translation to a CGP(s) representing a move of the CGP from it's home or canonical orientation and position into a new orientation and position prior to applying the motion to the CGP. Consider the case in which X is a point x:

$$h(w, X(x)) = \max_{t \in [0,1]} \{w \cdot (R(\hat{n}, t\theta)(x - x_a) + x_a + t x_{tr})\}. \quad \text{(Eqn. 12)}$$

Let $R_{\hat{n}z}$ be the minimal rotation that takes $\hat{n}$ to the z axis. Then, $$R(\hat{n}, t\theta) = R_{\hat{n}z}^{-1} \begin{pmatrix} \cos(t\theta) & -\sin(t\theta) & 0 \\ \sin(t\theta) & \cos(t\theta) & 0 \\ 0 & 0 & 1 \end{pmatrix} R_{\hat{n}z}.$$

Defining:

$$x^* = R_{\hat{n}z}(x - x_a) \text{ and,}$$

$$w^* = R_{\hat{n}z} w, \quad \text{(Eqn. 13)}$$

and doing some obvious algebra, one has:

$$w \cdot X(t, x) = w^* \cdot \begin{pmatrix} \cos(t\theta) & -\sin(t\theta) & 0 \\ \sin(t\theta) & \cos(t\theta) & 0 \\ 0 & 0 & 1 \end{pmatrix} x^* + tw \cdot x_{tr} + w \cdot x_a \quad \text{(Eqn. 14)}$$

The $t \in [0,1]$ where $w \cdot X(t,x)$ is possibly maximized are 0, 1, and t such that $$\frac{\partial}{\partial t} w \cdot X(t, x) = 0.$$

The last case entails solving for $t \in [0,1]$ such that:

$$0 = \frac{\partial}{\partial t} w \cdot X(t, x) = w^* \cdot \theta \begin{pmatrix} -\sin(t\theta) & -\cos(t\theta) & 0 \\ \cos(t\theta) & -\sin(t\theta) & 0 \\ 0 & 0 & 0 \end{pmatrix} x^* + w \cdot x_{tr} \quad \text{(Eqn. 15)}$$

By inspection (Eqn. 15) is linear in $\cos(t\theta)$ and $\sin(t\theta)$ and otherwise independent of t, so it can be solved in terms of to by the usual substitution methods, e.g., $y = \sin(t\theta)$, etc. Finding all solutions $t \in [0,1]$, evaluate $w \cdot X(t,x)$ at those t and $t=0$, 1. The maximizing value is then plugged into (Eqn. 9) and (Eqn. 10) specialized to $X=x$.

If P is a polyhedron with vertices $X=\{p_i\}$, one can compute $h(w,X(P))$ by computing the values of $h(w,X(p_i))$ and choosing the greatest value. Then compute $s(w,X(P))$ as $s(w,X(p^*))$ for a consistently chosen vertex $p^*$ that maximizes this value. Since the above methods enable $h(w,X(P))$ and $s(w,X(P))$ to be computed as needed by the Generalized Gilbert/Foo algorithm (Table 2), they enable computation of the minimum distance vector between the convex hulls of the volumes swept by convex polyhedra under screw motion, with accuracy limited only by machine precision and the numerical properties of the algorithm.

This simple method of computing the support function requires $O(n)$ time for a polyhedron with n vertices. To exploit the use of hill-climbing from the enhanced Gilbert/Foo algorithm to efficiently (roughly $O(\sqrt{n})$ compute the support functions for a polyhedron undergoing screw motion requires some care. Assume that which vertices are adjacent to each vertex is pre-computed and stored as a part of the polyhedron representation. This application now describes a technique that incorporates hill-climbing and is roughly $O(\sqrt{n})$ for screw motions with bounded rotation.

Define the support vertex set of a polyhedron P relative to a vector w to be the set of all vertices p such that $w \cdot p = h(w,P)$. One can compute $s(w,X(P))$ and $h(w,X(P))$ for a polyhedron P undergoing screw motion $X(t)$; $t \in [0,1]$ by doing the following:

1) Compute the support vertex set of $X(0,P)$ relative to w, exploiting hill-climbing and taking into account co-planarity of vertices on a common facet.

2) Then, track the changes in the support vertex set as t increases from 0 to 1. For each new vertex p that enters the set, compute $h(w,X(P))$.

3) For a consistently chosen vertex $p^*$ that maximizes this value, return $s(w,X(p^*))$.

To track changes in the support vertex set during screw motion, observe that each vertex that enters the set as t increases must be adjacent (via an edge on the polyhedron) to some current member for the set. Furthermore, at each time $t_i$ when the support vertex set is nondegenerately planar, by taking the dot-product of the axis of rotation $\hat{n}$ (recall that rotation angles are non-negative) with the cross-products of w and each member of the current support vertex set, one can determine which members will immediately leave and which will remain until a new vertex joins the set. The vertices that do not leave the set immediately will be co-linear and lie parallel to the rotation axis. As a consequence of convexity (of the polyhedron), it is sufficient to choose a single vertex $p_i^*$ from these remaining vertices and determine the smallest time $t_{i+1} > t_i$ at which $$w \cdot X(t_{i+1}, p_{i+1}') = w \cdot X(t_{i+1}, p_i^*)$$

for some vertex $p_{i+1}'$ adjacent to $p_i^*$. To get the set of support vertices at time $t_{i+1}$, apply hill-climbing with plateau-following to P with respect to $X^{-1}(t_{i+1},w)$ using $p_i^*$ as a starting point. The above discussion provides an example of how a vertex on a polyhedron can be translated to an edge adjacent vertex.

The key is, given points x and y, how to find all $t\in[0,1]$ such that:

$$w \cdot X(t,x) = w \cdot X(t,y). \qquad \text{(Eqn. 16)}$$

Using the definition (Eqn. 3) of screw motion X one sees that (Eqn. 16) is equivalent to:

$$w \cdot R(\hat{n}, t\theta)(x-y) = 0 \qquad \text{(Eqn. 17)}$$

As above, let $R_{\hat{n}z}$ be the minimal rotation that takes $\hat{n}$ to the z axis. Let $$w^* = R_{\hat{n}z} w \text{ and,} \qquad \text{(Eqn. 18)}$$

$$x^* = R_{\hat{n}z}(x-y) \qquad \text{(Eqn. 19)}$$

By substitution, (Eqn. 17) is true only when, $$w^* \cdot \begin{pmatrix} \cos(t\theta) & -\sin(t\theta) & 0 \\ \sin(t\theta) & \cos(t\theta) & 0 \\ 0 & 0 & 1 \end{pmatrix} x^* = 0$$

By applying the usual trigonometric substitutions, simple algebra, and solving a quadratic equation all solution values of $t\in[0,1]$ can be easily found.

Note that in order to be conservative with respect to numerical precision issues, the current support vertex set at a given t in any given implementation may need to be a superset of the theoretical set at that t.

Now bound the approximation error with respect to the actual distance between the swept volumes, considering the contribution to error associated with a single body. By convexity of the CGPs, it suffices to consider the case of a line segment.

First, consider a point rotated by angle θ about an axis a distance r away. The distance between the arc the point follows and the line segment between its original and final locations is bounded by $$r\left(1 - \cos\left(\frac{\theta}{2}\right)\right)$$

For a line segment that has projected length l perpendicular to the axis of rotation, an $$\left(\frac{l}{2}\sin\theta\right)$$

term is needed to account for the greatest minimum distance possible between an axis of rotation on the segment and the boundary of the convex hull. For the maximum distance between the region swept by the segment and the convex hull of that region, one obtains the bound:

$$r\left(1 - \cos\left(\frac{\theta}{2}\right)\right) + \frac{l}{2}\sin(\theta) \qquad \text{(Eqn. 20)}$$

(Eqn. 20) also bounds the error contribution by a rigid body with CGPs that have maximum projected diameter l. Compared to the r sin $$\left(\frac{\theta}{2}\right)$$

error bound resulting from just computing distance before and after the rotation, one sees that the part of the error dependent on rotational radius r decreases quadratically with the rotation angle instead of linearly by considering the series expansions.

Figure 1:
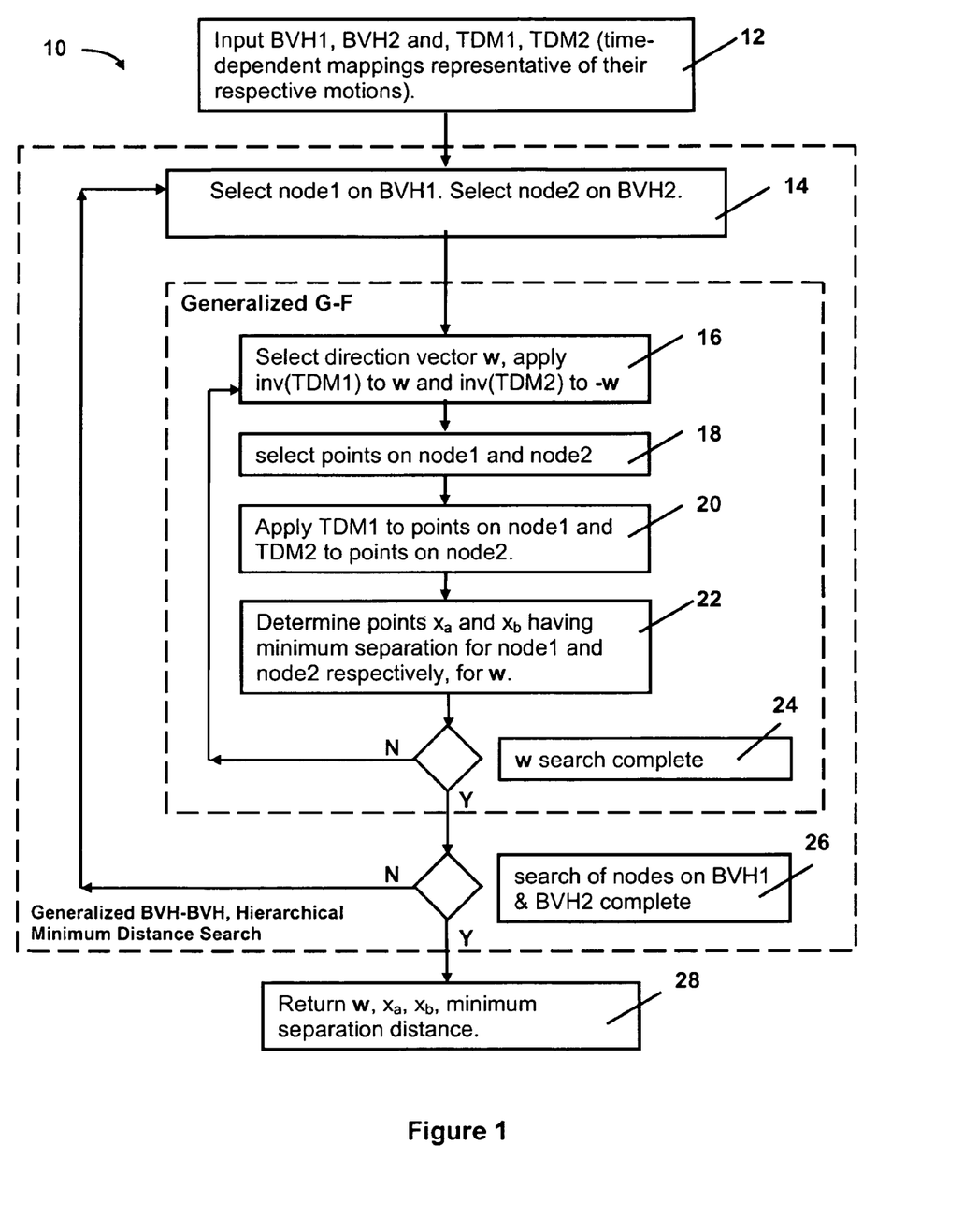
FIG. 1 is a schematic flow chart illustrating an embodiment of a method according to the present invention.

FIG. 1 is a schematic flow chart illustrating an embodiment of a method 10 according to the present invention. At step 12 representations are provided for the $1^{rst}$ body and the $2^{nd}$ body, and time-dependent mappings are provided of their respective motions, i.e. TDM1 and TDM2. The representations can be BVH models of the $1^{rst}$ and $2^{nd}$ bodies or optionally, can be other representations as used in the art to produce BVH representations.

Steps 14 through 26 of the method comprise a hierarchical minimum distance search of the volumes virtually swept by the $1^{rst}$ and $2^{nd}$ bodies undergoing their respective motions, as developed by the present invention. These steps can be accomplished by application of the Generalized BVH-BVH pseudocode presented in Table 4.

Steps 16 through 24 of the method comprise the Generalized Gilbert/Foo algorithm as developed by the present invention, and can be accomplished by the application of the pseudocode presented in Table 2.

At step 14 a node (node1) is selected from BVH1 and a node (node2) is selected from BVH2. At step 16 a direction vector is selected from a set as described by Gilbert and Foo and the inverse of the time-dependent mapping (TDM1) applied to the direction vector for node 1 and the inverse of TDM2 applied to the negative of the direction vector for node2 (i.e. the direction vector associated with node2 is in the opposed direction to the direction vector associated with node1).

At step 18 points are selected on node1 and node2. At step 20 the time-dependent mappings TDM1 and TDM2 are applied to these points respectively for node1 and node2 and at step 22 the points $x_b$ and $x_a$ having minimum separation for the volumes virtually swept, i.e. the virtual convex hulls generated by the motions of node1 and node2, along the direction vector selected in step 16 is computed. Steps 16 through 24 represent a search of direction vectors and points on the virtual convex hulls corresponding to node1 and node2 and their respective motions. At step 24 a next pair of nodes for the BVH representations is selected and the process is repeated.

At step 28, the result of performing the hierarchical minimum distance search is provided to a user, and the method ends. The results can include i) determining whether or not the two bodies will collide, i.e. a clearance exits or does not exist, ii) a value of the clearance between the two bodies, iii) the minimum separation between the two bodies and iv) pairs of points of closest approach.

As readily understood by one of skill in the art, the method of the invention can be practiced on control apparatuses for robotic hardware, such as an internal or external microprocessor or computer programmed with software embodying steps of the method of the invention, application specific integrated circuits, and like hardware or hardware/software combinations.

The methods described above can be embodied in a computer readable medium as appropriate for a given application. The term "computer-readable medium" refers to any medium that participates in providing instructions to a processor for execution. As used herein, the term "code" and/or "software" refers to a set of instructions that are communicated to a processor. "Computer readable media" may take many forms, including but not limited to, "non-volatile media", "volatile media", and "transmission media". "Non-volatile media" includes, for example, optical or magnetic disks such as used for a storage medium. "Volatile media" includes dynamic memory. Common forms of "computer-readable media" include floppy disks, flexible disks, hard disks, magnetic tape, other magnetic mediums, CD-ROM or other optical medium, RAM, PROM, EPROM, FLASH EPROM, and other memory chips or cartridges, a carrier wave, or any medium from which a computer or processor, as those terms are known to those skilled in the art, can read. Databases, data, and/or records can be recorded or stored on computer readable media.

The terms "computer", "processor", or "processing means" are used herein to refer generally to a programmable apparatus or terminal in communication with a programmable apparatus, having a processor or other equivalent hardware, as well known by those skilled in the art. Each "computer", "processor", or "processing means" referred to herein includes the necessary "computer-readable" media to perform the functions or methods described herein, or is in communication with the necessary computer-readable media. The phrase "in communication with" as it is used herein refers to a coupling between system elements wherein information is transmittable from one element to the other, whether such information is communicated directly, or via other system elements.

INDUSTRIAL APPLICABILITY

The invention is illustrated by the following non-limiting examples.

Example 1

In robot motion, such computations are useful to avoid damaging expensive robot hardware and apparatus manipulated by robots in a potentially closed-environment. This approach can be used to determine a clearance, to determine the size of the clearance, and to detect a collision by determining a zero clearance.

Example 2

In virtual reality environments, such computations are useful to maintain realism by preventing objects in the environment from appearing to pass through other objects. The present invention is particularly appropriate for VR applications because of its computational efficiency.

The preceding examples can be repeated with similar success by substituting the generically or specifically described operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method practiced on a computer for clearance detection that maps motions of a first body and a second body, for detecting a clearance between the first body and the second body, wherein the first body undergoes a first motion and the second body undergoes a second motion, the method comprising the steps of:

providing a first bounding volume hierarchy (BVH) representation for the first body and a second BVH representation for the second body;

providing a first time-dependent mapping representative of the first motion, the first time-dependent mapping having a first inverse mapping and, providing a second time-dependent mapping representative of the second motion, the second time-dependent mapping having a second inverse mapping;

performing a hierarchical minimum-distance search with respect to a first volume virtually swept by the first BVH representation of the first body undergoing the first motion and a second volume virtually swept by the second BVH representation of the second body undergoing the second motion, the hierarchical minimum distance search comprising, applying the first inverse mapping to a first direction vector and applying the first time-dependent mapping to a first node in the first BVH representation to determine a first directionally furthest location on a first node swept volume, the first node-swept volume virtually swept by the first node in the first BVH representation of the first body undergoing the first motion and, applying the second inverse mapping to a second direction vector and applying the second time-dependent mapping to a second node in the second BVH representation to determine a second directionally furthest location on a second node-swept volume, the second node-swept volume virtually swept by the second node in the second BVH representation of the second body undergoing the second motion;

detecting the clearance between the first body and the second body; and, providing the result of detecting the clearance between the first body and the second body to a user, to allow the user to perform one or more tasks selected from planning a motion for at least one of the first body and the second body, detecting a collision between the first body and the second body and, detecting a collision between an obstacle and at least one of the first body and the second body.

2. The method of claim 1, further comprising the step of determining a size of the clearance.

3. The method of claim 1 wherein:
the first motion comprises a first translation concurrent with a first rotation; and,
the second motion comprises a second translation concurrent with a second rotation.

4. The method of claim 1 wherein:
the first motion comprises a first translation; and,
the second motion comprises a second translation.

5. The method of claim 1 wherein:
the first motion comprises a first rotation; and,
the second motion comprises a second rotation.

6. The method of claim 1 wherein:
the first motion comprises a rotation; and,
the second motion comprises a translation.

7. The method of claim 1 wherein the first BVH representation of the first body comprises a first tree of nodes, the first tree of nodes comprising convex geometric primitives, the first node selected from the first tree of nodes and, the first node comprising a first geometric primitive.

8. The method of claim 7 wherein the second BVH representation of the second body comprises a second tree of nodes, each node of the second tree of nodes being a convex geometric primitive, the second node selected from the second tree of nodes and, the second node comprising a second geometric primitive.

9. The method of claim 2 wherein the first BVH representation of the first body comprises a first tree of nodes, each node of the first tree of nodes being a convex geometric primitive, the first node selected from the first tree of nodes and, the first node comprising a first geometric primitive.

10. The method of claim 9 wherein the second BVH representation of the second body comprises a second tree of nodes, each node of the second tree of nodes being a convex geometric primitive, the second node selected from the second tree of nodes and, the second node comprising a second geometric primitive.

11. The method of claim 1 further comprising the step of:
  detecting a collision.

12. The method of claim 7 wherein one or more of the convex geometric primitives comprising the first tree of nodes comprises a convex polyhedron, the method additionally comprising the steps of:
  determining the directionally furthest point of a volume virtually swept by the polyhedron by determining a directionally furthest vertex on the polyhedron with respect to the first direction vector under the first inverse mapping; and,
  determining a transition of the directionally furthest vertex to an edge adjacent vertex on the polyhedron relative to the first direction vector under the first inverse mapping.

13. The method of claim 8 wherein one or more of the convex geometric primitives of the second tree of nodes comprises a convex polyhedron, the method additionally comprising the steps of:
  determining the directionally furthest point of a volume virtually swept by the polyhedron by determining a directionally furthest vertex on the polyhedron with respect to the second direction vector under the second inverse mapping; and,
  determining a transition of the directionally furthest vertex to an edge-adjacent vertex on the polyhedron relative to the second direction vector under the second inverse mapping.

14. A non-transitory computer readable medium tangibly embodying at least one set of instructions for clearance detection that maps motions of a first body and a second body for detecting a clearance between the first body and the second body, wherein the first body undergoes a first motion and the second body undergoes a second motion, the at least one set of instructions for performing the steps of:
  receiving a first boundary volume hierarchy (BVH) representation for the first body and a second BVH representation for the second body;
  receiving a first time-dependent mapping representative of the first motion, the first time-dependent mapping having a first inverse mapping and, receiving a second time-dependent mapping of the second motion, the second time dependent mapping having a second inverse mapping;
  performing a hierarchical minimum-distance search with respect to a first volume virtually swept by the first BVH representation of the first body undergoing the first motion and a second volume virtually swept by the second BVH representation of the second body undergoing the second motion, the hierarchical minimum distance search comprising,
    applying the first inverse mapping to a first direction vector and applying the first time-dependent mapping to a first node in the first BVH representation to determine a first directionally furthest location on a first node swept volume, the first node-swept volume virtually swept by the first node in the first BVH representation of the first body undergoing the first motion and,
    applying the second inverse mapping to a second direction vector and applying the second time-dependent mapping to a second node in the second BVH representation to determine a second directionally furthest location on a second node-swept volume, the second node-swept volume virtually swept by the second node in the second BVH representation of the second body undergoing the second motion;
  detecting the clearance between the first body and the second body and,
  providing the result of detecting the clearance between the first body and the second body to a user, to allow the user to perform one or more tasks selected from planning a motion for at least one of the first body and the second body, detecting a collision between the first body and the second body and, detecting a collision between an obstacle and at least one of the first body and the second body.

* * * * *